United States Patent
Bycroft et al.

(10) Patent No.: US 12,554,985 B2
(45) Date of Patent: Feb. 17, 2026

(54) OPERATIONAL NEURAL NETWORK PERFORMANCE VIA FEATURE SPACE ANALYSIS

(71) Applicant: The Aerospace Corporation, El Segundo, CA (US)

(72) Inventors: Benjamen Paul Bycroft, Los Angeles, CA (US); Avinash Mayank Vakil, San Jose, CA (US); Ryan Scott Williams, Redondo Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 558 days.

(21) Appl. No.: 18/184,433

(22) Filed: Mar. 15, 2023

(65) Prior Publication Data
US 2024/0311631 A1    Sep. 19, 2024

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ........ G06N 20/00; G06N 20/10; G06N 20/20; G06N 3/02; G06N 3/04; G06N 3/045; G06N 3/0495; G06N 3/08; G06N 3/092; G06N 3/096; G06N 3/0985
See application file for complete search history.

(56) References Cited

U.S. PATENT DOCUMENTS

| | | | |
|---|---|---|---|
| 9,779,081 B2 | 10/2017 | Simard et al. | |
| 2002/0040367 A1 | 4/2002 | Choi et al. | |
| 2019/0164278 A1 | 5/2019 | Abramoff et al. | |
| 2022/0292371 A1* | 9/2022 | Ishii | G06N 3/09 |
| 2022/0398717 A1* | 12/2022 | Hébert | G06N 3/09 |

OTHER PUBLICATIONS

Danka, Tivadar, "Does a neural network know when it doesn't know?"—available at https://towardsdatascience.com/does-a-neural-network-know-what-it-doesnt-know-c2b4517896d7. Aug. 29, 2019.
Papernot, Nicolas, et al., "Deep k-Nearest Neighbors: Towards Confident, Interpretable and Robust Deep Learning"—available at https://arxiv.org/pdf/1803.04765.pdf.
Papernot, Nicolas, et al., "How to know when machine learning does not know"—available at http://www.cleverhans.io/security/2019/05/20/dknn.html. May 20, 2019.

* cited by examiner

*Primary Examiner* — Shane D Woolwine
(74) *Attorney, Agent, or Firm* — Knobbe, Martens, Olson & Bear, LLP

(57) ABSTRACT

Systems and methods are provided for generating supplemental or updated machine learning models based on analysis of feature space data observed at inference time using an existing machine learning model.

20 Claims, 9 Drawing Sheets

OPERATIONAL NEURAL NETWORK PERFORMANCE VIA FEATURE SPACE ANALYSIS

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a machine learning model may be implemented as an artificial neural network. Artificial neural networks are artificial in the sense that they are computational entities, analogous to biological neural networks, but implemented by computing devices. Output of neural-network-based models, typically in the form of a score, is obtained by doing a "forward pass." The forward pass involves multiplying large neural network weight matrices, representing the parameters of the model, by vectors corresponding to input vectors or hidden intermediate representations, as well as performing other mathematical operations. The parameters of a neural network can be set in a process referred to as training.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
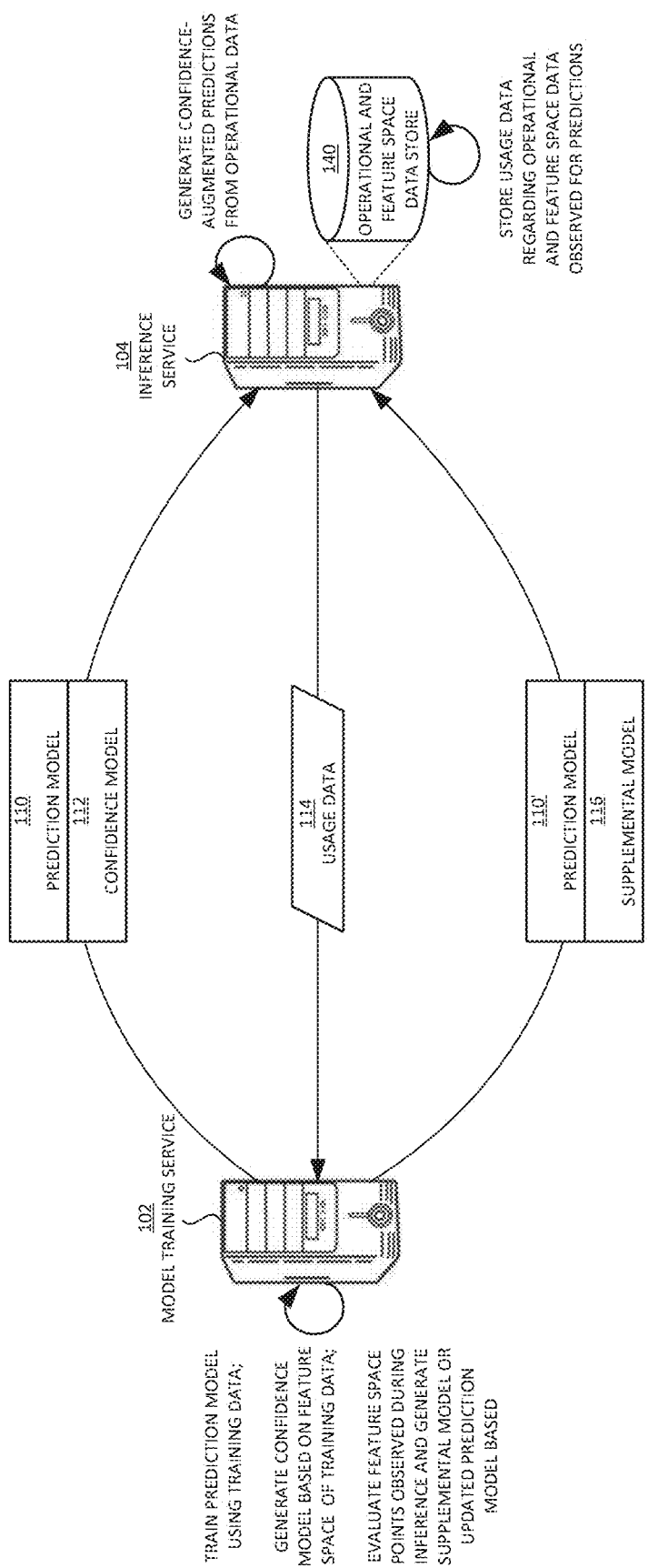
FIG. 1 is a diagram of illustrative data flows and interactions between a model training service and an inference service according to some embodiments.

The present disclosure is directed to generating supplemental or updated models based on analysis of feature space data observed at inference time using an existing machine learning model. Generally described, a machine learning model may be trained to generate prediction output (e.g., classification output or regression output). To generate a prediction output from an operational input, the machine learning model may determine or generate feature space data that represents the operational input within a feature space from which the machine learning model has been configured to generate prediction output. For example, the feature space data may represent a particular point in multidimensional feature space (referred to herein as a feature space point). A prediction output for the operational input (e.g., a classification or regression output) may then be determined either directly from the feature space point (e.g., using a final layer of an artificial neural network) or from additionally-processed internal data (e.g., using one or more internal hidden layers of the artificial neural network after the layer from which the feature space point is generated). Over the course of evaluating multiple operational inputs and generating corresponding prediction outputs, the feature space points that have been generated from the operational data inputs can be analyzed to identify novelties at a feature space level, such as a drift in the features associated with a given class, a new class that the machine learning model is not trained to classify, and the like.

Some conventional machine learning models are configured and trained to produce classification scores that reflect the likelihood or "confidence" that a particular input is properly classified or not classified in a particular classification. For example, input may be analyzed using a machine learning model, and the output of the analysis for a particular classification may be a classification score in the range [0.0, 1.0]. A higher score indicates a higher probability or confidence that the input is properly classified in the particular classification, and a lower score indicates a lower probability or confidence that the input is properly classified in the particular classification. However, although the output may be generated by a trained and tested model, the model may not have been trained and tested using data that is similar to the particular operational data currently being analyzed by the model. In some cases, there may be a drift in the features associated with a class over time such that the feature space points for an operational input that should be identified in the class drift towards an area of the feature space associated with another class, or otherwise drift away from the area of the feature space associated with the current class. For example, if a model is trained to recognize and classify articles of clothing based on images and/or data about the articles of clothing, there may be a drift in features associated with certain classes over time due to changing fashion trends (e.g., pants get shorter, shorts get longer, etc.). Because conventional models are static once trained, such a feature space drift can reduce the accuracy of the models. In some cases, there may be a new class that develops after a model is trained and deployed such that the feature space points generated by the model from operational data associated with the new class are not classified properly. For example, if a model is trained to recognize and classify vehicles, the model will not be able to correctly recognize a new type of vehicle that is developed and observed. Similar issues arise with conventional machine learning models configured and trained to produce regression output. Although the regression models may be trained to generate output based on a feature space learned during training, the regression models may fail to produce correct or expected prediction output when there is feature space drift, new developments, or the like.

Some aspects of the present disclosure address some or all of the issues noted above, among others, through analyzing the feature space data (e.g., feature space points) generated from operational data when producing prediction output at inference time. By analyzing the feature space data in this way, novelties such as drifts in features, new classes, and the like can be identified. In some embodiments, each individual feature space point observed at inference time, or a statistically significant portion thereof, can be saved for evaluation. In some embodiments, data regarding the feature space points may be maintained, such as a model or function (e.g., a curve) describing the observed feature space points.

Evaluation of the feature space data observed at inference time (whether individual feature space points, or representations of the feature space points) can result in identification of various novelties to be addressed.

In some embodiments, a drift in feature space points associated with a given class or regression output can be identified. To identify such a drift, one or more distance metrics may be generated in order to determine a spatial drift of feature space points within the feature space. For example, a Bhattacharyya distance, a Mahalanobis distance, or a Wasserstein metric may be generated to represent the distance between [1] a feature space point associated with a class, and [2] a centroid or other representative point associated with the class as determined during training. If the distance metric exceeds a threshold or tends to increase over time, then a detection of drift may be triggered.

In some embodiments, a cluster of feature space points may be identified that fall outside the areas of the feature space that are associated with trained classes, outside of high-confidence regions, or the like. For example, k-means clustering, density-based spatial clustering of applications with noise (DBSCAN), or the like may be performed on feature space points observed at inference time, and the resulting clusters may be compared to those observed from training data. If a novel cluster is observed outside the expected areas of the feature space, then detection of a new class or regression may be triggered.

In some embodiments, a quantity of feature space points may be observed outside of the areas of the feature space that are associated with trained classes, outside of high-confidence regions, or the like, but the feature space points may not be clustered. For example, k-means clustering, DBSCAN, or the like may be performed on feature space points observed at inference time, but may fail to cluster the various feature space points observed outside of the areas of the feature space that are associated with trained classes. This may trigger detection of an un-clustered novelty scenario.

Additional aspects of the present disclosure relate to addressing feature space novelties detected from analysis of operational feature space data, in some cases before failure or occurrence of other undesirable outcomes.

In some embodiments, a supplemental machine learning model may be generated to produce improved prediction output based on the feature space points currently being observed at inference time. For example, if a machine learning model is an artificial neural network, the feature space points that are evaluated may be generated by an internal or "hidden" layer of the model. The model may continue providing valuable feature space points from operational input, even if the model is unable to produce accurate prediction output due to a drift of feature space points associated with a particular class, development of a cluster associated with a new class, development of un-clustered points associated with a new class, etc. To address these novelties, a supplemental model (e.g., a set of one or more artificial neural network layers) may be generated to produce accurate prediction output from the feature space points generated from the original model.

Advantageously, the supplemental model can leverage the feature space learned during the original training of the prediction model and use the feature space points determined within that feature space to generate prediction output in a way that addresses various novelties that were unknown or unconsidered at training time. For example, the supplemental model may be configured to produce prediction output representing additional or alternative classes that the prediction model is not configured to produce. As another example, the supplemental model may be configured to address and properly classify feature space "drift' over time, without requiring retraining of the prediction model. As a further example, the supplemental model may be configured to evaluate data in a higher-dimensional feature space within which otherwise un-clustered or unclassifiable data can be clustered and classified.

In some embodiments, instead of generating a supplemental model that leverages feature space points generated by the original model, the original model itself may be retrained. For example, the original model may be retrained to address a feature space drift or a cluster of feature space points indicative of a new class.

In some embodiments, such as when a non-clustered set of feature space points is detected, a supplemental model (e.g., a kernel) may be generated and added to perform special processing on the non-clustered feature space points. For example, a kernel may be configured to push operational data associated with the un-clustered feature space points into a higher dimensional feature space where the points may be clustered into one or more clusters that may be associated with a particular class or regression output.

Various aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrative only, and are not intended to be limiting. In addition, any feature, process, device, or component of any embodiment described and/or illustrated in this specification can be used by itself, or with or instead of any other feature, process, device, or component of any other embodiment described and/or illustrated in this specification Example Computing Environment FIG. 1 shows an example computing environment in which aspects of the present disclosure may be implemented. In some embodiments, as shown, the computing environment may include a model training service 102 and an inference service 104.

The model training service 102 and inference service 104 may communicate with each other via one or more communication networks (omitted from the illustration for simplicity). In some embodiments, a communication network (also referred to simply as a "network") may be a publicly-accessible network of linked networks, possibly operated by various distinct parties, such as the Internet. In some cases, the network may be or include a private network, personal area network, local area network, wide area network, global area network, cable network, satellite network, cellular data network, etc., or a combination thereof, some or all of which may or may not have access to and/or from the Internet.

The model training service 102 may be a logical association of one or more computing systems for training machine learning models and corresponding confidence models. The model training service 102 (or individual components thereof) may be implemented on one or more physical computing systems such as blade servers, midrange computing devices, mainframe computers, desktop computers, or any other computing device configured to provide computing services and resources. The model training service 102 may include any number of such computing systems.

The inference service 104 may be a logical association of one or more computing systems for using machine learning models and corresponding confidence models to evaluate operational data and generate confidence-augmented prediction output. The inference service 104 (or individual components thereof) may be implemented on one or more physical computing systems such as blade servers, midrange computing devices, mainframe computers, desktop computers, or any other computing device configured to provide computing services and resources. The inference service 104 may include any number of such computing systems.

In some embodiments, the features and services provided by the model training service 102 or inference service 104 may be implemented as web services consumable via one or more communication networks. In further embodiments, the model training service 102 or inference service 104 (or individual components thereof, or a combination thereof) are provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment. In some embodiments, the model training service 102 and inference service 104 are subsystems of the same system and/or computing environment.

FIG. 1 further illustrates various operations and data flows between the model training service 102 and the inference service 104. In some embodiments, the model training service 102 may use a corpus of training data to train a machine learning model to generate prediction output (e.g., classification or regression output). The trained machine learning model may also be referred to as a prediction model 110. In some embodiments, the model training service 102 may also generate a model of the feature space of the training data set observed during training of the prediction model. This model may be referred to as a confidence model 112. The confidence model may be used to provide training-support-based confidence augmentation to output of the prediction model. The prediction model 110 and confidence model 112 may be provided to the inference service 104.

The inference service 104 may use the prediction model 110 and confidence model 112 to generate confidence-augmented predictions from operational data. As used herein the term "operational data" is used to distinguish input data evaluated using the deployed prediction model 110 from other data, such as training data used to train the prediction model 110, any testing data used to test the prediction model 110 before deployment, etc. As used herein, the term "prediction" is used to distinguish operations performed to evaluate operational data using the trained prediction model 110 from operations performed during training to evaluate training data, testing data, etc.

The inference service 104 may include an operational and feature space data store 140 (also referred to herein simply as a data store 140) to store usage data regarding the prediction process. For example, the data store 140 may be a persistent data store in which data is stored on a hard disk, flash memory, or other persistent storage. As another example, the data store 140 may be a volatile data store in which data is stored in random access memory (RAM) or other volatile storage.

The usage data that is stored in the data store 140 may include various data obtained, generated, or otherwise associated with the inference process. In some embodiments, the inference service 104 may store operational data that has been evaluated, the feature space data generated during evaluation of the operational data, the prediction output generated based on evaluation of the operational input data, other data, or some combination thereof. For example, during the course of inference (e.g., after evaluation of each operational data input or after various time or input intervals), the inference service 104 may store data regarding the prediction process. The inference service 104 may store operational data that has been input or accessed by the inference service 104. The inference service 104 may evaluate the operational data using the prediction model 110 (and, in some cases, the confidence model 112) to generate prediction output, such augmented classification output, augmented prediction output, or the like. The prediction output, confidence output, or augmented prediction output generated via the prediction process may also or alternatively be stored in the data store 140. Intermediate data that is generated during the prediction process, such as feature space data, may be stored in the data store 140.

The inference service 104 may store feature space data for each operational data item that is evaluated, or for some subset thereof. For example, each time an operational data item is input and a feature space point is generated therefrom (as described in greater detail below), the inference service 104 may store the feature space point (alone, or in connection with the operational data, prediction data, etc.). Illustratively, the feature space point may be represented as a vector or coordinate within the feature space.

As another example, the inference service 104 may randomly or pseud-randomly determine, for a given feature input data item, whether to store the feature space point. As another example, the inference service 104 may store each nth feature space point, or x out of every y feature space points (where n, x, and y are positive numbers). As another example, the inference service may select which feature space points to store using one or more criteria, such as whether a confidence in the prediction output generated from the feature space point satisfies a threshold or fails to satisfy the threshold.

In some embodiments, rather than storing feature space data comprising the feature space points observed during inference, the inference service 104 may store feature space data that summarizes or represents the feature space points observed during a period of time. For example, the inference service 104 may generate a model or function that represents the feature space points, or from which insights or generalizations of the feature space points can be derived.

The inference service 104 may send usage data 114 to the model training service 102. For example, the inference service 104 may send the usage data 114 upon request or in response to other events, such as at various time intervals or after processing of threshold quantities of operational data items. The usage data 114 may be or include data stored in the data store 140 described above.

The model training service 102 may evaluate the usage data 114 and identify novelties in the feature space points observed during inference. Based on identified novelties, the model training service 102 may retrain the prediction model 110 to generate an updated prediction model 110', generate a supplemental model 116, generate or update other models (e.g., confidence model 112), or some combination thereof. An example routine is described in greater detail below for identification of feature space novelties and generating or updating models based thereon.

Although FIG. 1 shows the inference service 104 storing usage data and sending usage data 114 to the model training service 102, the example is for illustrative purposes only and is not intended to be limiting, required, or exhaustive. In some embodiments, the inference service 104 may send the usage data 114 to some other system or service for evaluation of the feature space, identification of novelties, and generation of updated or supplemental models. In some embodiments, the inference service 104 may perform evaluation of feature space, identification of novelties, and generation of updated or supplemental models alone, or in combination with some other system or service.

Example Generation of Prediction Model and Confidence Model

Figure 2:
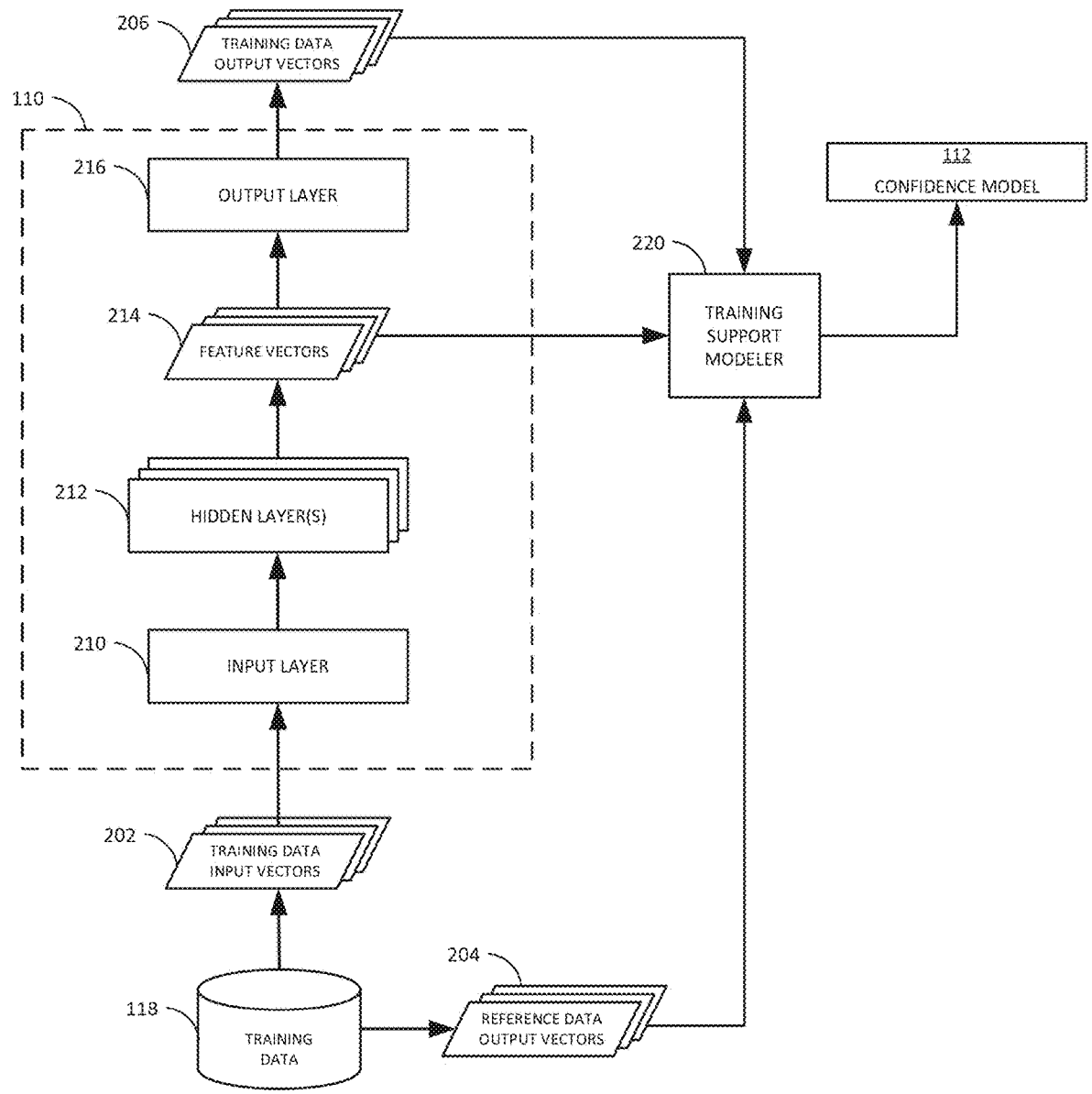
FIG. 2 is a diagram of training an illustrative artificial neural network and generating a confidence model for training-support-based augmentation according to some embodiments.

FIG. 2 illustrates training of a prediction model 110 and generation of a confidence model 112 by a model training service 102 according to some embodiments. In the illustrated example, the prediction model 110 is implemented as an artificial neural network ("NN"). However, the features and techniques described herein may be applied to any of a variety of different machine learning model algorithms or architectures, including but not limited to: neural-network-based classification models, neural-network-based regression models, linear regression models, logistic regression models, decision trees, random forests, support vector machines ("SVMs"), Naïve or non-Naïve Bayes networks, k-nearest neighbors ("KNN") models, k-means models, clustering models, or any combination thereof. For brevity, certain aspects are not described with respect to each possible machine learning model that may be used. In practice, however, many or all of the aspects of the disclosure may apply to other machine learning models, including but not limited to those listed herein.

Generally described, NNs—including deep neural networks ("DNNs"), convolutional neural networks ("CNNs"), recurrent neural networks ("RNNs"), other NNs, and combinations thereof—have multiple layers of nodes, also referred to as "neurons." Illustratively, a NN may include an input layer, an output layer, and any number of intermediate, internal, or "hidden" layers between the input and output layers. The individual layers may include any number of separate nodes. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. When a NN is used to process input data in the form of an input vector or a matrix of input vectors (e.g., a batch of training data input vectors), the NN may perform a "forward pass" to generate an output vector or a matrix of output vectors, respectively. The input vectors may each include n separate data elements or "dimensions," corresponding to the n nodes of the NN input layer (where n is some positive integer). Each data element may be a value, such as a floating-point number or integer. A forward pass typically includes multiplying the matrix of input vectors by a matrix representing the weights associated with connections between the nodes of the input layer and nodes of the next layer, and applying an activation function to the results. The process is then repeated for each subsequent NN layer. Some NNs have hundreds of thousands or millions of nodes, and millions of weights for connections between the nodes of all of the adjacent layers.

As shown in FIG. 2, the example prediction model 110 implemented as a NN has an input layer 210 with a plurality of nodes, one or more internal layers 212 (also refereed to as "hidden layers") with a plurality of nodes, and an output layer 216 with a plurality of nodes. The specific number of layers shown in FIG. 2 is illustrative only, and is not intended to be limiting. In some NNs, different numbers of internal layers and/or different numbers of nodes in the input, internal, and/or output layers may be used. For example, in some NNs the layers may have hundreds or thousands of nodes or more. As another example, in some NNs there may be 1, 2, 4, 5, 10, 50, or more internal layers. In some implementations, each layer may have the same number or different numbers of nodes. For example, the input layer 210 or the output layer 216 can each include more or less nodes than the internal layers 212. The input layer 210 and the output layer 216 can include the same number or different number of nodes as each other. The internal layers 212 can include the same number or different numbers of nodes as each other.

Input to a NN, such as the prediction model 110 shown in FIG. 2, occurs at the input layer 210. A single input may take the form of an n-dimensional input vector with n data elements, where n is the number of nodes in the input layer 210. During training, the input vector may be a training data input vector 202. In some cases, multiple input vectors may be input into—and processed by—the NN at the same time. For example, when the NN is trained, a set of training data input vectors 202 (e.g., a "mini batch") may be arranged as an input matrix. In this example, each row of the input matrix may correspond to an individual training data input vector 202, and each column of the input matrix may correspond to an individual node of the input layer 210. The data element in any given training data input vector 202 for any given node of the input layer 210 may be located at the corresponding intersection location in the input matrix.

The connections between individual nodes of adjacent layers are each associated with a trainable parameter, such as a weight and/or bias term, that is applied to the value passed from the prior layer node to the activation function of the subsequent layer node. For example, the weights associated with the connections from the input layer 210 to the internal layer 212 it is connected to may be arranged in a weight matrix W with a size m x n, where m denotes the number of nodes in an internal layer 212 and n denotes the dimensionality of the input layer 210. The individual rows in the weight matrix W may correspond to the individual nodes in the input layer 210, and the individual columns in the weight matrix W may correspond to the individual nodes in the internal layer 212. The weight w associated with a connection from any node in the input layer 210 to any node in the internal layer 212 may be located at the corresponding intersection location in the weight matrix W.

Illustratively, the training data input vector 202 may be provided to a computer processor that stores or otherwise has access to the weight matrix W. The processor then multiplies the training data input vector 202 by the weight matrix W to produce an intermediary vector. The processor may adjust individual values in the intermediary vector using an offset or bias that is associated with the internal layer 212 (e.g., by adding or subtracting a value separate from the weight that is applied). In addition, the processor may apply an activation function to the individual values in the intermediary vector (e.g., by using the individual values as input to a sigmoid function or a rectified linear unit ("ReLU") function).

In some embodiments, there may be multiple internal layers 212, and each internal layer may or may not have the same number of nodes as each other internal layer 212. The weights associated with the connections from one internal layer 212 (also referred to as the "preceding internal layer") to the next internal layer 212 (also referred to as the "subsequent internal layer") may be arranged in a weight matrix similar to the weight matrix W, with a number of rows equal to the number of nodes in the subsequent internal layer 212 and a number of columns equal to the number of nodes in the preceding internal layer 212. The weight matrix may be used to produce another intermediary vector using the process described above with respect to the input layer 210 and first internal layer 212. The process of multiplying intermediary vectors by weight matrices and applying activation functions to the individual values in the resulting intermediary vectors may be performed for each internal layer 212 subsequent to the initial internal layer.

The intermediary vector that is generated from the last internal layer 212 prior to the output layer 216 may be referred to as a feature vector 214. The feature vector 214 includes data representing the features that have been extracted from the training data input vector 202 by the NN. Illustratively, the feature vector 214 may be thought of as defining a point in the feature space within which the NN is configured to operate. The feature space is determined over the course of design and training of the model, and is expected to encompass the relevant features used to make accurate output determinations (e.g., classification determinations or regression determinations). Thus, the feature vector 214 generated from any given input vector 202 may be considered to be a processed, distilled representation of the relevant information regarding the input vector 202 from which an output determination is to be made.

In some embodiments, an intermediary vector generated from an internal layer other than the last internal layer may be the feature vector 214. For example, the feature vector 214 may include output of the second-to-last internal layer, third-to-last internal layer, first internal layer, or a combination of data from multiple internal layers that may or may not include the last internal layer. Illustratively, such configurations may be beneficial for NN architectures such as autoencoder/decoder networks, U-Nets, RNNs, and the like where feature spaces that would be most useful may found in layers or combinations of layers other than the last internal layer. In some embodiments, there may be no output layer 216, and therefore the feature vector 214 may be final output of the NN.

The output layer 216 of the NN makes output determinations from the feature vector 214. Weights associated with the connections from the last internal layer 212 to the output layer 216 may be arranged in a weight matrix similar to the weight matrix W, with a number of rows equal to the number of nodes in the output layer 216 and a number of columns equal to the number of nodes in the last internal layer 212. The weight matrix may be used to produce an output vector 206 using the process described above with respect to the input layer 210 and first internal layer 212.

The output vector 206 may include data representing the classification or regression determinations made by the NN for the training data input vector 202. Some NNs are configured to make u classification determinations corresponding to u different classifications (where u is a number corresponding to the number of nodes in the output layer 216, and may be less than, equal to, or greater than the number of nodes n in the input layer 210). The data in each of the u different dimensions of the output vector 206 may be a confidence score indicating the probability that the training data input vector 202 is properly classified in a corresponding classification. Some NNs are configured to generate values based on regression determinations. The output value(s) is/are based on a mapping function modeled by the NN. Thus, an output value from a NN-based regression model is the value that corresponds to the training data input vector 202.

The training data 118 from which the training data input vectors 202 are drawn may also include reference data output vectors 204. Each reference data output vector 204 may correspond to a training data input vector 202, and may include the "correct" or otherwise desired output that a model should produce for the corresponding training data input vector 202. For example, a reference data output vector 204 may include scores indicating the proper classification(s) for the corresponding training data input vector 202 (e.g., scores of 1.0 for the proper classification(s), and scores of 0.0 for improper classification(s)). As another example, a reference data output vector 204 may include scores indicating the proper regression output(s) for the corresponding training data input vector. The goal of training may be to minimize the difference between the output vectors 206 and corresponding reference data output vectors 204.

The feature vectors 214, in addition to being used to generate output vectors 206, may also be analyzed to determine various training-support-based metrics. Once the machine learning model has been trained, the training data input vectors 202 may be analyzed again using the trained prediction model 110 to generate feature vectors 214 and output vectors 206. In some embodiments, as shown, a training support modeler 220 may then analyze the output vectors 206 with respect to the corresponding reference data output vectors 204 to determine whether prediction model 110 has produced output in various training-support-based classes. In some embodiments, if the prediction model 110 is a classification model, the classes may include: a true positive classification ("TP"), a false positive classification ("FP"), a true negative classification ("TN"), and/or a false negative classification ("FN") for a given training data input vector 202. The feature vectors 214 generated from each training data input vector 202 may then be tagged or otherwise associated with the TP, FP, TN, and FN determinations. The training support modeler 220 may determine one or more training support mixture density functions, distributions, or related metrics for use in augmenting the classification determinations made by the trained machine learning model and/or for use by the machine learning model itself to generate the classification determinations. In some embodiments, if the prediction model 110 is a regression model, the classes may include: a small error, a large positive error, and/or a large negative error for a given training data input vector 202. The feature vectors 214 generated from each training data input vector 202 may then be tagged or otherwise associated with the small error, large positive error, and large negative error determinations. The training support modeler 220 may determine one or more training support mixture density functions, distributions, or related metrics for use in augmenting the regression determinations made by the trained machine learning model and/or for use by the machine learning model itself to generate the regression determinations.

In some embodiments, the training support modeler 220 may determine mixture density functions, distributions, or related metrics of other types. For example, the distributions may also or alternatively include a distribution of all training points regardless of status of TP. FP. TN, FN, large error, small error, etc. (e.g., to identify regions where there is insufficient support for regression determinations). As another example, the distributions may be distribution of any other data available at training time, such as metadata regarding individual training items (e.g., image metadata such as exposure, zoom, lens, date/time, etc.). As a further example, the distributions may be distribution of data derived after training. Illustratively, a NN may be used to detect and identify corners ("keypoints") of an object in an image. Those keypoints may be used by an unrelated algorithm after the NN to estimate the position and orientation ("pose") of the object. A distribution for the keypoint detection NN could be generated using the outputs of the pose estimation-such as "error in the true and estimated angle about X, Y, Z"-even if those results were not available at training time for the NN.

Illustrative processes for generating training support mixture density functions, distributions, or related metrics for models, including classification models and regression models, are described in greater detail in commonly-owned U.S. patent application Ser. No. 17/249,604, filed Mar. 5, 2021 and titled Training-Support-Based Machine Learning Classification and Regression Augmentation, the contents of which are incorporated by reference herein and made part of this specification.

Example Feature Space Evaluation and Model Generation

Figure 3:
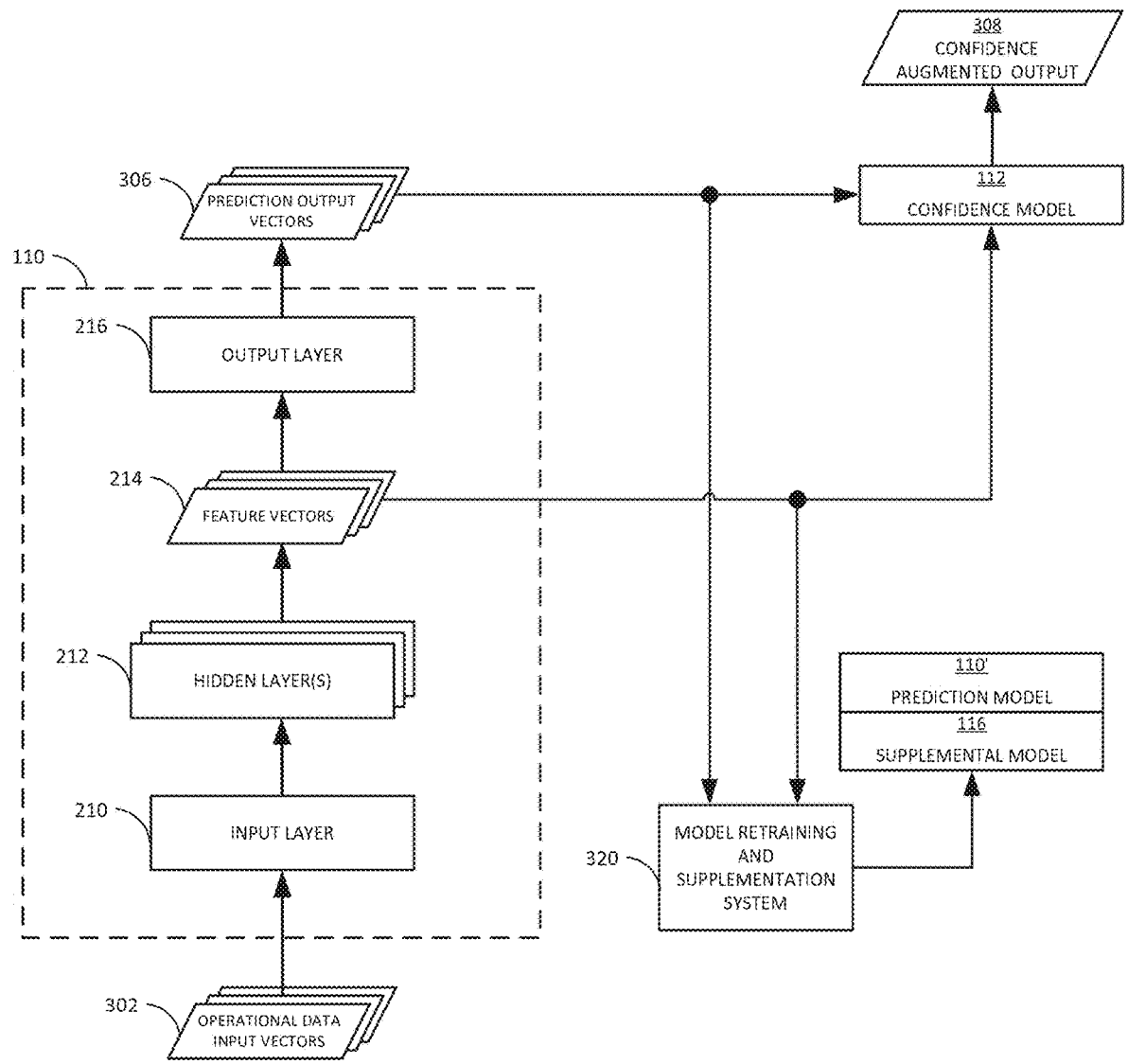
FIG. 3 is a diagram of using an illustrative artificial neural network at inference time and generating a supplemental or updated artificial neural network according to some embodiments.

FIG. 3 illustrates use of a prediction model 110 and a confidence model 112 at inference time to evaluate operational data, generate feature data, and generate prediction output. The feature data is evaluated and, based on the evaluation, a supplemental model 116 or updated prediction model 110' is generated.

At inference time, instead of training data input vectors 202, the input data items evaluated by the prediction model 110 may be in the form of operational data input vectors 302 (also referred to as "operational input vectors" for brevity). The prediction output data generated by the prediction model 110 may be in the form of prediction output vectors 306.

During generation of prediction output data, the prediction model 110 may generate or otherwise obtain feature space data comprising a representation of the operational data in the feature space of the prediction model 110. For example, the prediction model 110 may generate a feature vector 214. The feature vector 214 may be used by the confidence model 112 to determine a degree of confidence in the prediction output vector 306. In some embodiments, the inference service 104 may generate a confidence augmented output 308, such as a weighted prediction output, a combination of prediction output and confidence output, or the like.

A set of prediction output vectors 306, feature vectors 214, operational data input vectors 302, or some combination thereof may be evaluated by a model retraining and supplementation system 320 (e.g., a subsystem of the model training service 102 or inference service 104) to generate a supplemental model 116 or an updated prediction model 110'.

Figure 4:
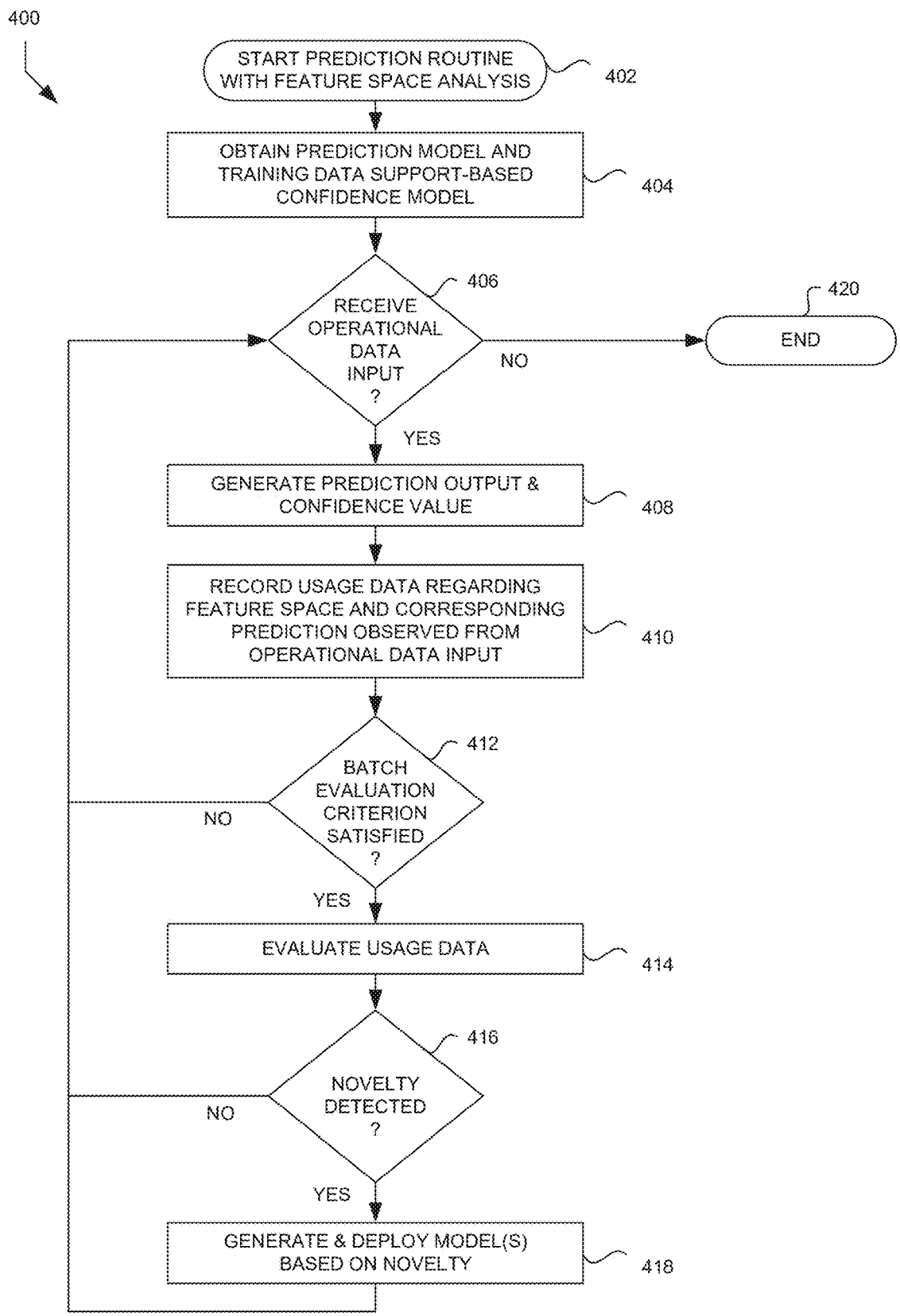
FIG. 4 is a flow diagram of an illustrative process for generating an updated or supplemental prediction model based on analysis of feature space data generated during inference according to some embodiments.

FIG. 4 illustrates an example routine 400 for generating a supplemental model or an updated prediction model based on usage data generated at inference time. Advantageously, a model training service 102 may execute the routine 400 or portions thereof to evaluate feature space data generated from operational data or otherwise observed at inference time, identify novelties in the feature space data, and generate a supplemental model or an updated prediction model to address the novelties. In some embodiments, another system, such as the inference service 104, may perform the routine 400 or portions thereof.

Routine 400 begins at block 402. In some embodiments, routine 400 may begin in response to an event, such as an inference service 104 or model training service 102 beginning operation. When the routine 400 begins, executable instructions may be loaded to or otherwise accessed in computer readable memory and executed by one or more computer processors, such as the memory and processors of computing system 900 described in greater detail below.

At block 404, the inference service 104 may obtain a prediction model 110 (and, optionally, a confidence model 112) from the model training service 102. In some embodiments, the prediction model 110 may be a NN-based machine learning model. The confidence model 112 may be or include one or more mixture density functions, distributions, or related metrics of training data support in the feature space for prediction output generated by the prediction model 110.

At decision block 406, the inference service 104 may determine whether operational data input has been received for prediction. If so, the routine 400 may proceed to block 408. Otherwise, if no operational data input has been received, the routine 400 may terminate at block 420.

At block 408, the inference service 104 may generate prediction output and a confidence value from the operational data input using the prediction model 110 and confidence model 112. In some embodiments, the inference service 104 may generate a classification or regression output from the operational data using the prediction model 110. The inference service 104 may also generate confidence output representing a degree of confidence in the prediction output based on the training data support in the feature space for the prediction output.

At block 410, the inference service 104 may record usage data regarding generation of the prediction output. The usage data may be, include, or represent feature space points observed in generating the prediction output, the operational data input from which the feature space points were generated, the prediction output ultimately generated, or some combination thereof.

In some embodiments, as described above, the inference service 104 may record usage data for each operational data item that is evaluated, or for some subset thereof. For example, each time an operational data item is input and a feature space point is generated therefrom (as described in greater detail below), the inference service 104 may store the feature space point (alone, or in connection with the operational data, prediction data, etc.). Illustratively, the feature space point may be represented as a vector or coordinate within the feature space. As another example, the inference service 104 may randomly or pseudo-randomly determine, for a given operational data item, whether to store the corresponding feature space point. As another example, the inference service 104 may store each nth feature space point, or x out of every y feature space points (where n, x, and y are positive numbers). As another example, the inference service 104 may select which feature space points to store using one or more criteria, such as whether a confidence in the prediction output generated from the feature space point satisfies a threshold.

In some embodiments, rather than storing feature space data comprising the feature space points observed during inference, the inference service 104 may store feature space data that summarizes or represents the feature space points observed during a period of time. For example, the inference service 104 may generate a model or function that represents the feature space points, or from which insights or generalizations of the feature space points can be derived.

At decision block 412, the inference service 104 may determine whether a batch evaluation criterion has been satisfied. In some embodiments, the batch evaluation criterion may relate to a quantity of usage data items that have been saved, a quantity of operational data items that have been evaluated, a period of time elapsed since the last batch evaluation, some other criterion, or a combination thereof. For example, the batch criterion may be a threshold quantity of usage data items that have been saved since the last time the batch evaluation criterion was satisfied (since the prediction model 110 was first used), such as a hundred, thousand, or million usage data items. As another example, the batch criterion may be a threshold amount of time elapsed, such as a day, a week, or a month. If the batch evaluation criterion has been satisfied, the routine 400 may proceed to block 414. Otherwise, if the batch evaluation criterion has not been satisfied, the routine 400 may return to a prior block, such as decision block 406 to determine whether additional operational input has been received.

At block 414, the model training service 102 may evaluate the usage data that is part of a batch received from the inference service 104. At decision block 416, the model training service can determine whether a novelty has been detected based on evaluation of the usage data. At block 418, the model training service 102 may generate and deploy one or more models (e.g., a supplemental model or updated prediction model) to address and correctly evaluate the detected novelty. To illustrate the operations and effects of blocks 414-418, the description that follows refers to the examples illustrated in FIGS. 5-7.

Figure 5:
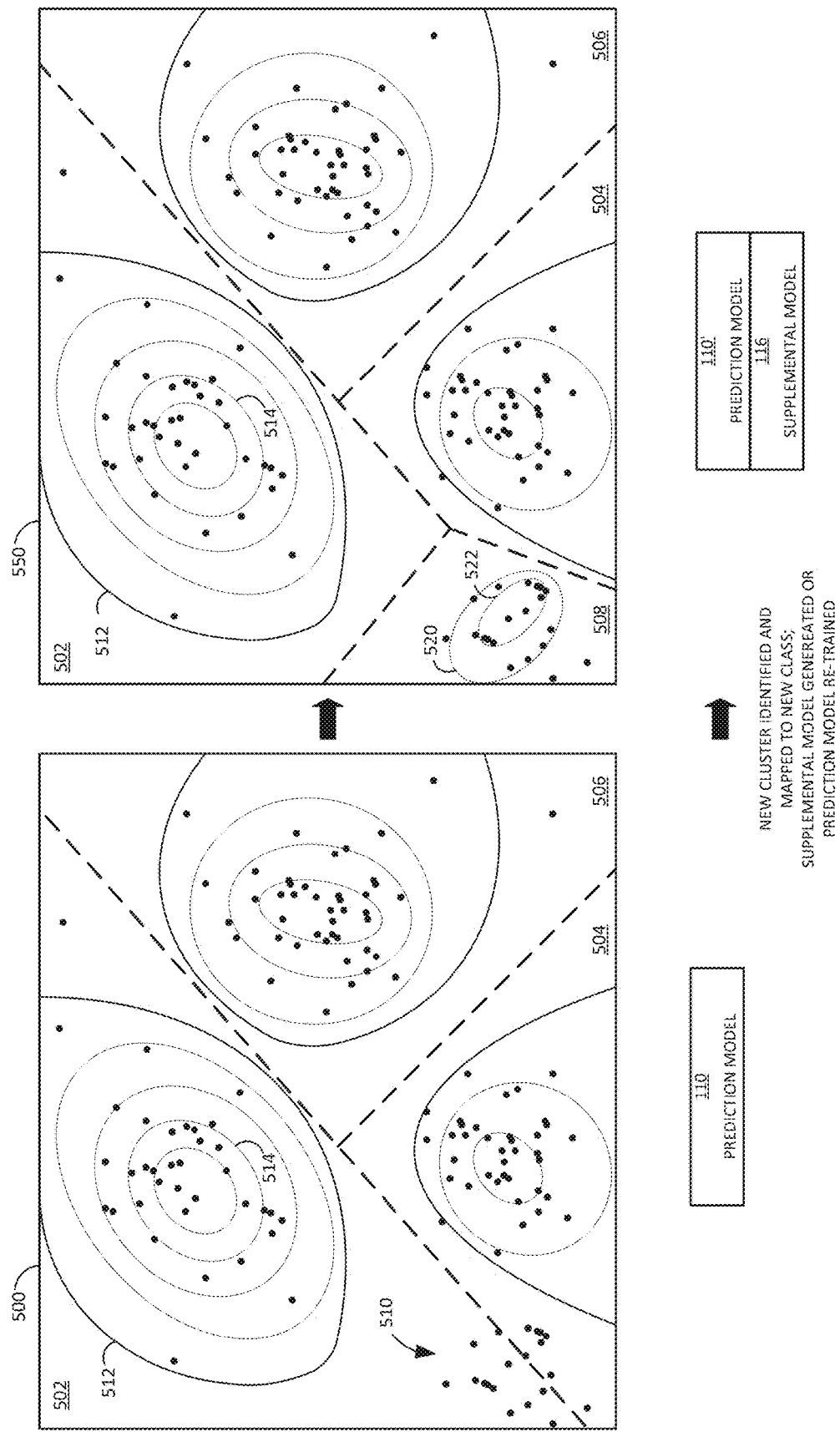
FIG. 5 is a diagram of using an illustrative artificial neural network at inference time to generate feature space data, and then evaluating the feature space data to generate prediction output using a supplemental model according to some embodiments.

FIG. 5 illustrates, on the left side of the figure, a set 500 of feature space points generated from operational data during prediction operations. The feature space points are clustered in three different classes into which the prediction model 110 is configured to classify operational data inputs. Generally, the prediction model 110 may classify a given operational data input into a class if a feature space point is located within the boundaries of the class. In the illustration, the class boundaries are indicated in dashed lines. Three classes are shown: class 502, class 504, and class 506.

The classification determinations may or may not be supported to various degrees by the training data used to train the prediction model 110. The confidence model 112 may be used to evaluate the training data support for the classification determinations. In the illustration, the generally elliptical lines correspond to different degrees of confidence. The concentric nature of the generally elliptical lines may be interpreted as topographical indicators in a third dimension overlayed on top of a two-dimensional set 500 of feature space points. Generally, higher degrees of confidence are represented by smaller ellipses with fewer internal ellipses, and thus higher values in the third dimension (the z-axis, or "elevation"). Lower degrees of confidence are represented by larger ellipses with more internal ellipses, and thus lower values in the third dimension. The region within generally elliptical line 512 indicates a relatively low degree of confidence for class 502 such that feature space points outside of the region, including a portion of feature space points 510 that are still within the outermost boundary of class 502, may be classified in class 502 with an extremely low degree of confidence, or may not be classified in class 502 at all. In contrast, the feature space points in the region within generally elliptical line 514 maybe classified in class 502 with a higher degree of confidence relative to points outside of generally elliptical line 514 but within generally elliptical line 512.

The example in FIG. 5 of a two-dimensional feature space with confidence indicated in a third dimension is for illustrative purposes only, and is not intended to be limiting or required. A topographical map with a height corresponding to degree of confidence in points and regions of a two-dimensional feature space is merely one method of visualizing a feature space and confidence in feature space points and regions. Moreover, it will be appreciated that in some embodiments a feature space may be defined in three or more dimensions, and potentially a large number of dimensions (e.g., dozens, hundreds, or more).

A cluster of feature space points 510 shown in FIG. 5 straddles the class boundary between classes 502 and 504 and falls outside of the higher confidence regions of the feature space associated with these classes. This feature space point cluster may be a novelty that is identified by the model training service 102. In some embodiments, the model training service 102 may be configured to determine that a novelty has been identified if the evaluated feature space points satisfy one or more criteria. For example, the criteria may include a threshold distance (e.g., based on a distance metric such as a Bhattacharyya distance, a Mahalanobis distance, or a Wasserstein metric) between [1] a centroid, average, or other representation of the potential novelty, and [2] a centroid, average, or other representation of existing classes within which the prediction model 110 is trained to classify data. Another example criterion may be a clustering criterion, such as a threshold quantity of unclassified feature space points being observed within a threshold distance of each other, or within a threshold distance of an average, a centroid, or some other representation of the potential novelty. Another example criterion may be a confidence-based criterion, such as a threshold quantity of unclassified or low-confidence classified feature space points being observed within a threshold distance of each other. If a set of feature space points, such as feature space points 510, satisfies one or more such criteria, then the set of feature space points 510 may be considered to be a novelty within the feature space and likely representative of a new class or a class that the prediction model 110 was otherwise not trained to recognize.

Figure 8:
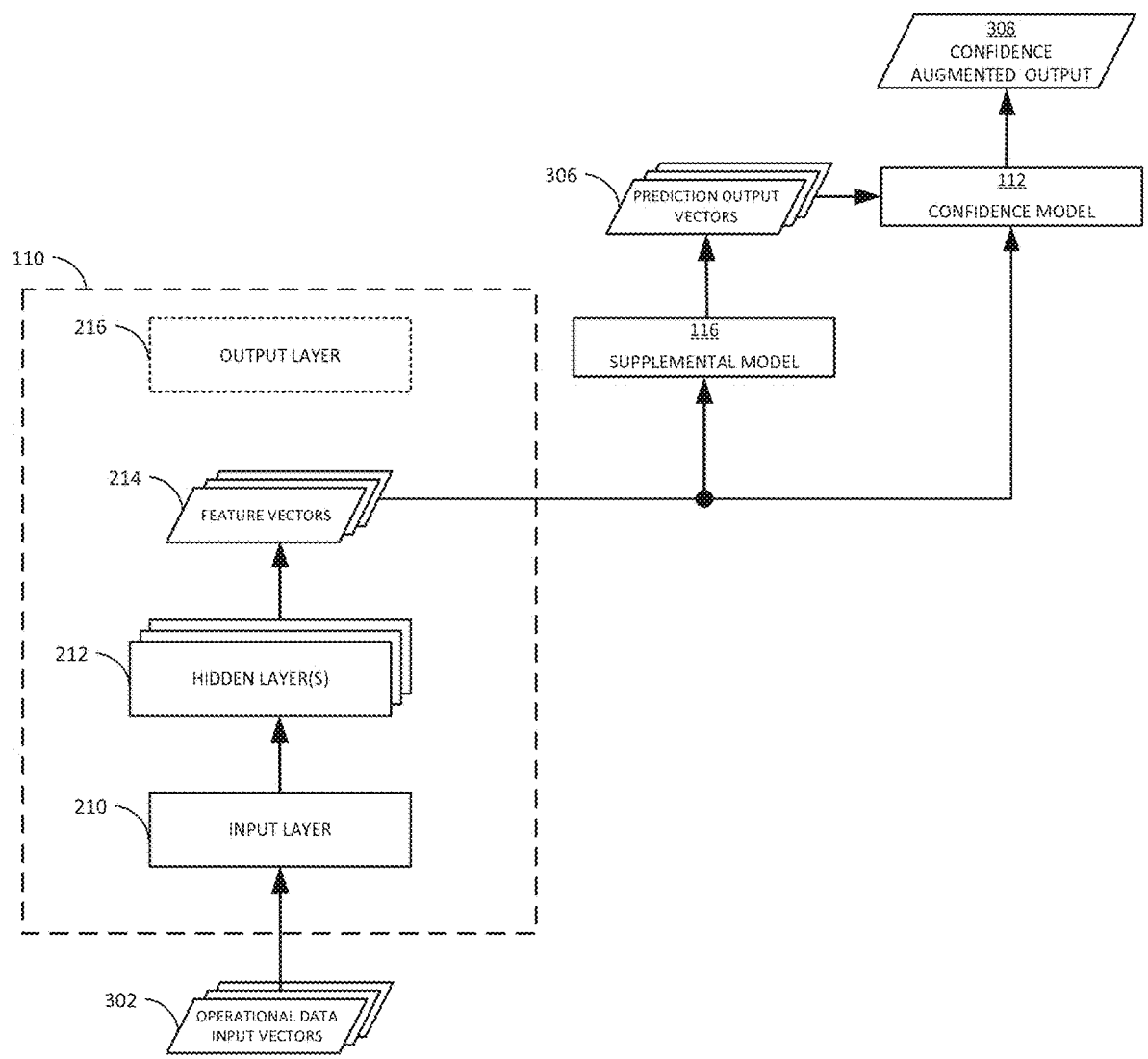
FIG. 8 is a diagram of illustrative distributions in a feature space, and generation of an updated or supplemental prediction model based on an analysis of the feature space according to some embodiments.

To address this type of novelty, the model training service 102 may generate a supplemental model 116. In some embodiments, the supplemental model 116 may be trained or otherwise configured to receive feature space data generated by the prediction model 110, such as a feature vector generated by an internal layer of the prediction model 110. The supplemental model 116 may then generate prediction output (e.g., classification or regression output) from the feature space data. In the example illustrated in FIG. 5, and with reference to set 550 of feature space points, the supplemental model 116 may advantageously be trained to make classification determinations for the new class 508 in addition to the original classes 502, 504, and 506. Advantageously, by leveraging the feature space data generated by the original prediction model 110, the model training service 102 can avoid a potentially costly process (in terms of time and computing resources) of restructuring the prediction model 110 to produce additional classification determinations. The model training service 102 can also avoid the potentially costly process (in terms of time and computing resources) of training a full supplemental model to produce feature space data, when the prediction model 110 already produces feature space data sufficient to identify the novel class. An example of a supplemental model 116 configured to evaluate feature space data generated by a prediction model 110 is illustrated in FIG. 8 and described in greater detail below.

In some embodiments, the model training service 102 may also or alternatively generate an updated prediction model 110' that is an updated version of the previous prediction model 110. For example, the model training service 102 may obtain or generate training data that is representative of or associated with feature space points 510, and retrain the prediction model 110 to generate updated prediction model 110', which classifies feature space points 510 into a new class 508. In some embodiments, the model training service 102 may also or alternatively generate a supplemental model 116 that is an updated version of the confidence model 112. For example, the model training service 102 may augment the confidence model 112 to make confidence determinations represented by generally elliptical lines 520 and 522. As another example, the model training service 102 may generate a new confidence model 112, as described in greater detail above.

Figure 6:
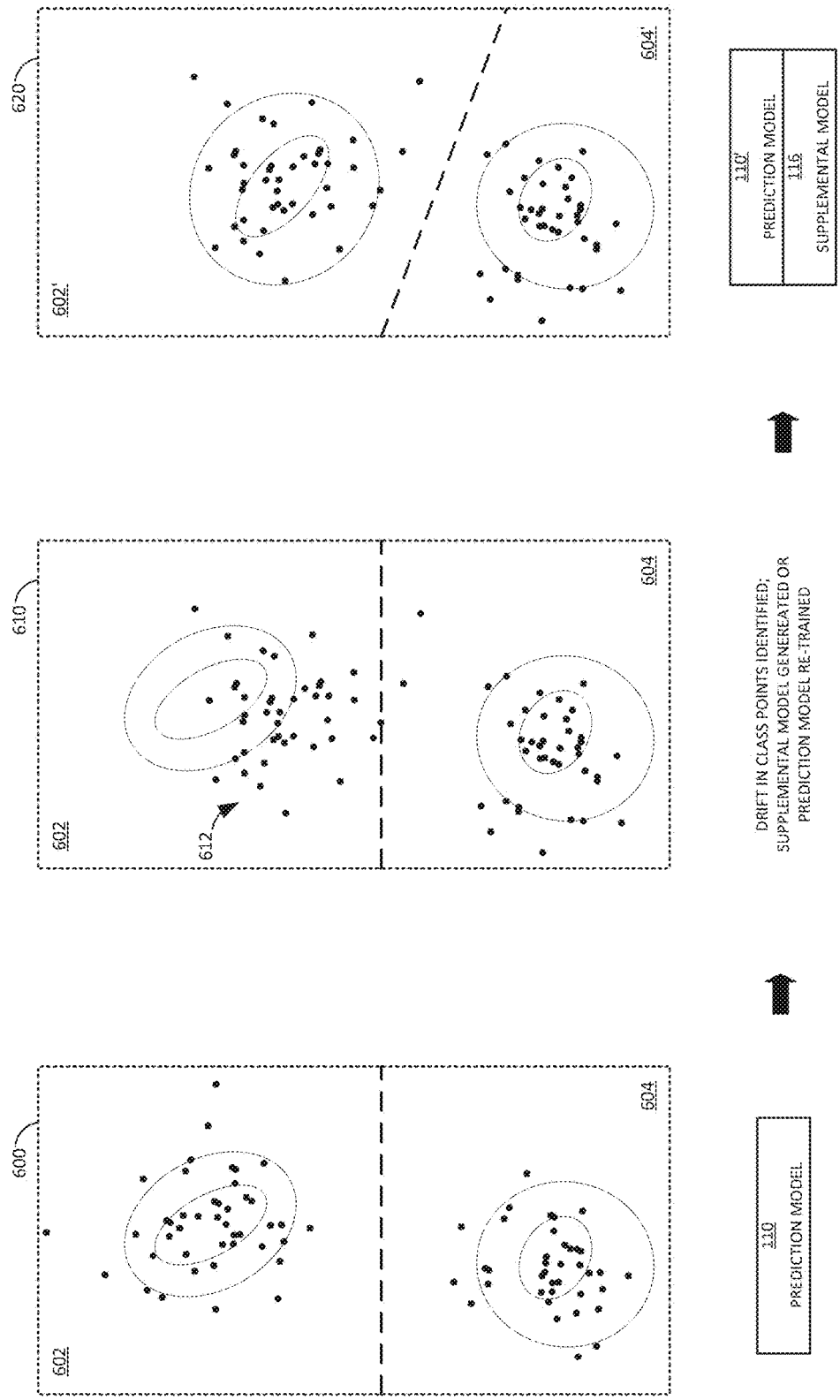
FIG. 6 is a diagram of illustrative distributions in a feature space, and generation of an updated or supplemental prediction model based on an analysis of the feature space according to some embodiments.

FIG. 6 illustrates another potential novelty that the model training service 102 may detect based on evaluation of feature space data observed at inference time. Set 600 of feature space points corresponds to feature space points generated from training data input at training time (e.g., a training feature space point cluster or multiple training feature space point clusters), or feature space points generated from operational data at inference time during prediction operations. The feature space points are clustered in two different classes into which the prediction model 110 is configured to classify operational data inputs. Generally, the prediction model 110 may classify a given operational data input into a class if a feature space point is located within the boundaries of the class. In the illustration, the class boundaries are indicated in dashed lines, and two classes are shown: class 602 and class 604. As with the example shown in FIG. 5, the classification determinations may or may not be supported to various degrees by the training data used to train the prediction model 110, and a confidence model 112 may be used to evaluate the training data support for the determinations. Such degrees of confidence are represented by generally elliptical lines.

Set 610 of feature space points corresponds to a subsequent set of feature space points generated from operational data at inference time during prediction operations. As shown, a cluster of feature space points 612 that may be properly classified within class 602 with a high or moderate degree of confidence have drifted away from the regions of high and moderate confidence for class 602, and some appear to approach or even cross the feature space boundary into a region of the feature space associated with class 604. If the same prediction model 110 and confidence model 112 continue to be used to evaluate such feature space points, the correct prediction output may be generated with low confidence, or prediction output that is incorrect altogether may be generated.

The cluster of feature space points 612 may be a novelty that is identified by the model training service 102. In some embodiments, the model training service 102 may be configured to determine that a novelty has been identified if the evaluated feature space points satisfy one or more criteria, such as the criteria described above with respect to FIG. 5. In the example illustrated in FIG. 6, the novelty may be detected based on a threshold distance (e.g., based on a distance metric) between the potential novelty (e.g., a centroid, average, or other representation of feature space points 612) and the feature space location or region of existing classes (e.g., a centroid, average, or other representation of the existing classes) within which the prediction model 110 is trained to classify data. Another example criterion may be a clustering criterion, such as a threshold quantity of feature space points 612 being observed within a threshold distance of each other, or within a threshold distance of an average, a centroid, or some other representation of the potential novelty. Another example criterion may be a confidence-based criterion, such as a threshold quantity of feature space points 612 being observed with a relatively low degree of confidence (e.g., confidence, as determined using confidence model 112, failing to satisfy a threshold).

While the potential novelty shown in FIG. 6 may be detected using one or more criteria as described above, the difference in the nature of the novelty may require additional or alternative criteria to distinguish it from the novelty shown in FIG. 5. For example, while the novelties in FIGS. 5 and 6 may each satisfy the criteria described above, the novelties are of different types: the novelty in FIG. 5 is representative of a new class, while the novelty in FIG. 6 is representative of a drift in feature space points of an existing class. To distinguish these novelties, the model training service 102 may be configured in some embodiments to apply one or more additional or alternative criteria. For example, if a set of feature space points that is likely associated with a novelty is detected while feature space points associated with high degrees of confidence in relation to existing class continue to be observed, as in the set 500 of feature space points illustrated in FIG. 5, the model training service 102 may determine that a new class has been detected. If a set of feature space points that is likely associated with a novelty is detected while feature space points associated with high degrees of confidence in relation to one or more existing classes are no longer observed (or are no longer observed with the same frequency or other measure of statistical significance with which they were observed previously at inference time), as in the set 610 of feature space points illustrated in FIG. 6, then a drift in feature space for an existing class has been detected.

To address this type of novelty, the model training service 102 may generate a supplemental model 116. In some embodiments, the supplemental model 116 may be trained or otherwise configured to receive feature space data generated by the prediction model 110, such as a feature vector generated by an internal layer of the prediction model 110. The supplemental model 116 may then generate prediction output (e.g., classification or regression output) from the feature space data. In the example illustrated in FIG. 6, and with reference to set 620 of feature space points, the supplemental model 116 may advantageously be trained to make classification determinations for existing class 602 based on the drifted feature space points 612. The existing class associated with new region of the feature space may be referred to as modified class 602', and the other class affected by the change in feature space regions may be referred to as modified class 604'. Advantageously, by leveraging the feature space data generated by the original prediction model 110, the model training service 102 can avoid a potentially costly (in terms of time and computing resources) process of training a full supplemental model to produce feature space data, when the prediction model 110 already produced feature space data sufficient to identify class 602' at the different location within the feature space. An example of a supplemental model 116 configured to evaluate feature space data generated by a prediction model 110 is illustrated in FIG. 8 and described in greater detail below.

In some embodiments, the model training service 102 may also or alternatively generate an updated prediction model 110' that is an updated version of the previous prediction model 110. For example, the model training service 102 may obtain or generate training data that is representative of or associated with feature space points 612, and retrain the prediction model to classify feature space points 612 into modified class 602'. In some embodiments, the model training service 102 may also or alternatively generate a supplemental model 116 that is an updated version of the confidence model 112, as described in greater detail above.

Figure 7:
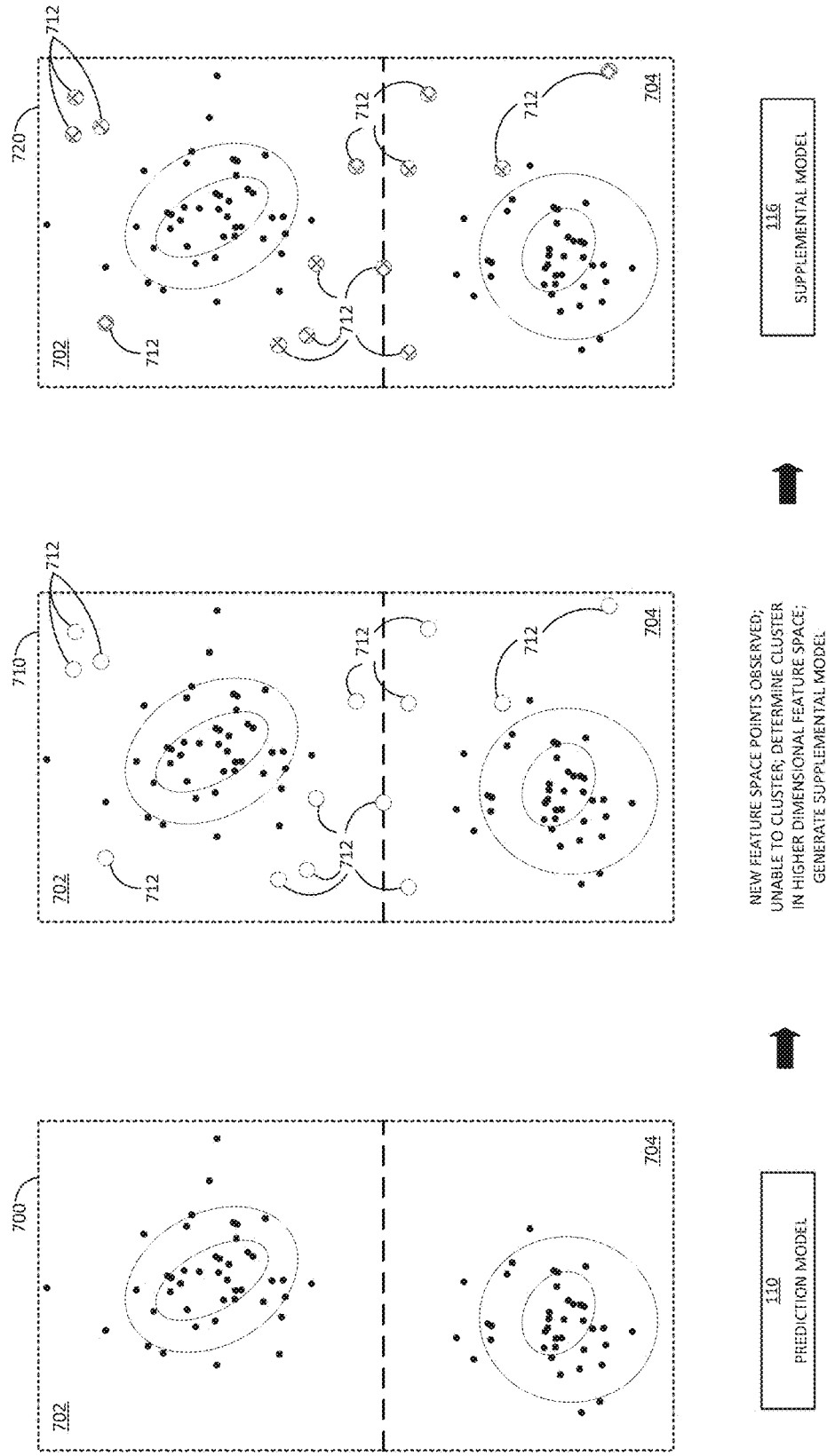
FIG. 7 is a diagram of illustrative distributions in a feature space, and generation of an updated or supplemental prediction model based on an analysis of the feature space according to some embodiments.

FIG. 7 illustrates another potential novelty that the model training service 102 may detect based on evaluation of feature space data observed at inference time. Set 700 of feature space points corresponds to feature space points generated from training data input at training time, or feature space points generated from operational data at inference time during prediction operations. The feature space points are clustered in two different classes into which the prediction model 110 is configured to classify operational data inputs. Generally, the prediction model 110 may classify a given operational data input into a class if a feature space point is located within the boundaries of the class. In the illustration, the class boundaries are indicated in dashed lines, and two classes are shown: class 702 and class 704. As with the examples described above, the classification determinations may or may not be supported to various degrees by the training data used to train the prediction model 110, and a confidence model 112 may be used to evaluate the training data support for the determinations. Such degrees of confidence are represented by generally elliptical lines.

Set 710 of feature space points corresponds to a subsequent set of feature space points generated from operational data at inference time during prediction operations. Feature space points 712 are shown as empty white circles with black outlines to distinguish them from the solid black circles that may be properly classified within classes 702 and 704. Feature space points 712 may not be properly classified within any existing class, and are shown scattered throughout the feature space represented by set 710. Because they are scattered throughout the feature space, feature space points 712 may not be clustered together and treated as a single set (e.g., a set of feature space points for a given class that has drifted within the feature space from the region originally associated with the class, as in FIG. 6, or a set of feature space points for a new class not originally part of the feature space, as in FIG. 5). For example, based on the feature space data represented by the feature space points 712, clustering methods such as k-means clustering, DBSCAN, etc. may be unable to group the feature space points 712 together in a particular cluster, either as part of an existing class or as part of a single, discrete new class.

The set of feature space points 712 may be a novelty that is identified by the model training service 102. In some embodiments, the model training service 102 may be configured to determine that a novelty has been identified if the evaluated feature space points satisfy one or more criteria, such as the criteria described above with respect to FIGS. 5-6. In the example illustrated in FIG. 7, the novelty may be detected based on a confidence-based criterion, such as a threshold quantity or statistically significant quantity of feature space points 712 being observed with a relatively low degree of confidence (e.g., confidence, as determined using confidence model 112, failing to satisfy a threshold). Due to the non-clustered nature of the set of feature space points 712, additional or alternative criteria may be used. For example, the novelty may be detected based on a threshold distance (e.g., based on a distance metric) between each point and each other point of the set of points that may be part of the novelty. As another example, the novelty may be detected based on a threshold quantity of feature space points being at least a threshold distance (e.g., based on a distance metric) from the feature space location or region of existing classes (e.g., a centroid, average, or other representation of the existing classes) within which the prediction model 110 is trained to classify data with a relatively high degree of confidence. Another example criterion may be a clustering criterion, such as a threshold quantity of feature space points 712 satisfying one or more criteria described above (indicating that they are likely not part of an existing class) in combination with the feature space points being unable to be clustered.

To address this type of novelty, the model training service 102 may generate a supplemental model 116. In some embodiments, the supplemental model 116 may be trained or otherwise configured to evaluate data in a higher-dimensional feature space than the feature space learned during training of the prediction model 110. For example, the feature space in which the prediction model 110 evaluates inputs may be an n-dimensional feature space, where n is a positive integer. However, as shown in FIG. 7, that feature space may not be adequate to cluster certain feature space points, such as feature space points 712, some or all of which may be representative of operational input items that are similar enough to belong to the same class. In order to facilitate clustering of such non-clustered feature space points, the supplemental model 116 may evaluate inputs in an m-dimensional feature space, where m is an integer and $m > n$.

In one specific non-limiting embodiment, the supplemental model 116 may be an artificial neural network or a partial artificial neural network, such as a set of one or more internal layers and an output layer. To evaluate inputs in a higher-dimensional feature space, one or more internal layers of the supplemental model 116 may include more nodes than the layer of the prediction model 110 that produces feature space points 712. The supplemental model 116 may receive feature space data (e.g., feature space vectors from an internal layer of the prediction model 110, representing feature space points 712), other data (e.g., operational input data, feature data from other layers of the prediction model 110), or some combination thereof and generate its own feature space data from which prediction output may be generated. For example, connections between [1] individual nodes of an internal layer of the prediction model 110 configured to produce feature space data and [2] individual nodes of an internal layer of the supplemental model 116 may each be associated with a trainable parameter, such as a weight and/or bias term, that is applied to the value passed from the prior layer node to the activation function of the subsequent layer node. Weights associated with the connections may be arranged in a weight matrix W with a size m×n, where n denotes the number of nodes in the relevant internal layer of the prediction model 110, and m denotes the number of nodes in the connected layer of the supplemental model 116. The weight matrix W may then be used to push the feature space data generated by the prediction model 110 into a higher-dimensional feature space of the supplemental model 116, where corresponding feature space points may be able to be clustered. As a result, in set 720, feature space points 712 (or, more precisely, the higher-dimensional feature space points that correspond to feature space points 712) may be determined to be part of a third class. The successful clustering of the feature space points 712 in set 720 and the resulting prediction output generated by the supplemental model 116 is illustrated by presenting the feature space points 712 in cross hatch to associate them in a higher-dimensional cluster not able to be visualized in the two/three-dimensional visualization of FIG. 7.

In some embodiments, rather than identifying a cluster of feature space points 712 in a higher-dimensional cluster, the feature space points 712 may be clustered by an entirely separate and otherwise unrelated feature space in the supplemental model 116. Novelties that are detected and addressed as described herein may be caused by, or be observed in, a variety of practical applications. For example, in space/defense applications, feature space novelty detection and the resulting operations to address the novelties may be used to flag new objects in space or warfare, new vehicle types or behaviors, or the like. As another example, in medical/biological applications, feature space novelty detection and the resulting operations to address the novelties may be used to identify new viral structures or behaviors. As a further example, autonomous driving applications, feature space novelty detection and resulting operations to address the novelties may be used to recognize that a new type of vehicle is on the road and the model needs to be adapted or supplemented to track the vehicle. The example applications described herein are illustrative only, and are not intended to be limiting, required, or exhaustive.

Example Supplemental Model Use

FIG. 8 illustrates use of a prediction model 110 and a supplemental model 116 at inference time to evaluate operational data, generate feature data, and generate prediction output.

At inference time, the data that is evaluated by the prediction model 110 may be in the form of operational data input vectors 302. The prediction model 110 may generate or otherwise obtain feature space data comprising a representation of the operational data in the feature space of the prediction model 110. For example, the prediction model 110 may generate a feature vector 214. The feature vector 214 may be generated by one or more internal layers 212 of the prediction model 110, such as the last internal layer 212, a preceding internal layer 212, or a combination of data from the last and one or more preceding internal layers 212. However, rather than (or in addition to) passing the feature vector 214 to an output layer of the prediction model 110, the feature vector 214 may be passed to the supplemental model 116. The supplemental model 116 may then generate output, such as a prediction output vector 306. In some cases, the output layer 216 of the prediction model 110 may no longer be used, in which case a composite model is formed of the input layer 210 and internal layer(s) 212 of the prediction model 110, and any internal layer(s) and output layer of the supplemental model 116.

In some embodiments, use of the supplemental model 116 to replace the output layers of the prediction model 110 could be dynamically determined at inference time, such as on a per-inference basis. For example, if the inference service 104 determines, using the supplemental model 116, that a particular feature vector is located inside a new or adjusted class of the supplemental model 116 (e.g., using a confidence or distance metric), then prediction output of the supplemental model 116 could take priority over the prediction model 110; otherwise, if the particular feature vector is not located inside a new or adjusted class of the supplemental model 116, then the inference service 104 can give priority to the output of the prediction model 110.

Advantageously, the supplemental model 116 can leverage the feature space learned during the original training of the prediction model 110 and use the feature space points determined within that feature space to generate prediction output in a way that addresses various novelties that were unknown or unconsidered at training time.

In some embodiments, the supplemental model 116 may be configured to produce prediction output representing additional or alternative classes that the prediction model 110 is not configured to produce. In some embodiments, the supplemental model 116 may be configured to evaluate data in a higher-dimensional feature space within which otherwise un-clustered or unclassifiable data can be clustered and classified.

In some embodiments, the supplemental model 116 may be configured to address and properly classify feature space "drift" over time, without requiring retraining of the prediction model 110. In some embodiments, rather than classifying feature space drift to address it, feature space drift may be tracked for purposes of describing changes in the input space. For example, in a fashion classification system, fashion trends may change such that pants become longer. An inference service 104 may track the drift in features which correspond to "pant length" for the class of pants/shorts, not only to detect drift but to provide insight into that changing trend. In this example, a prediction model 110 which was trained to classify pants vs. shorts vs. t-shirts could be used to provide insight into changing trends in fashion, not because it was trained to but because it learned features useful for that purpose coincidentally.

Execution Environment

Figure 9:
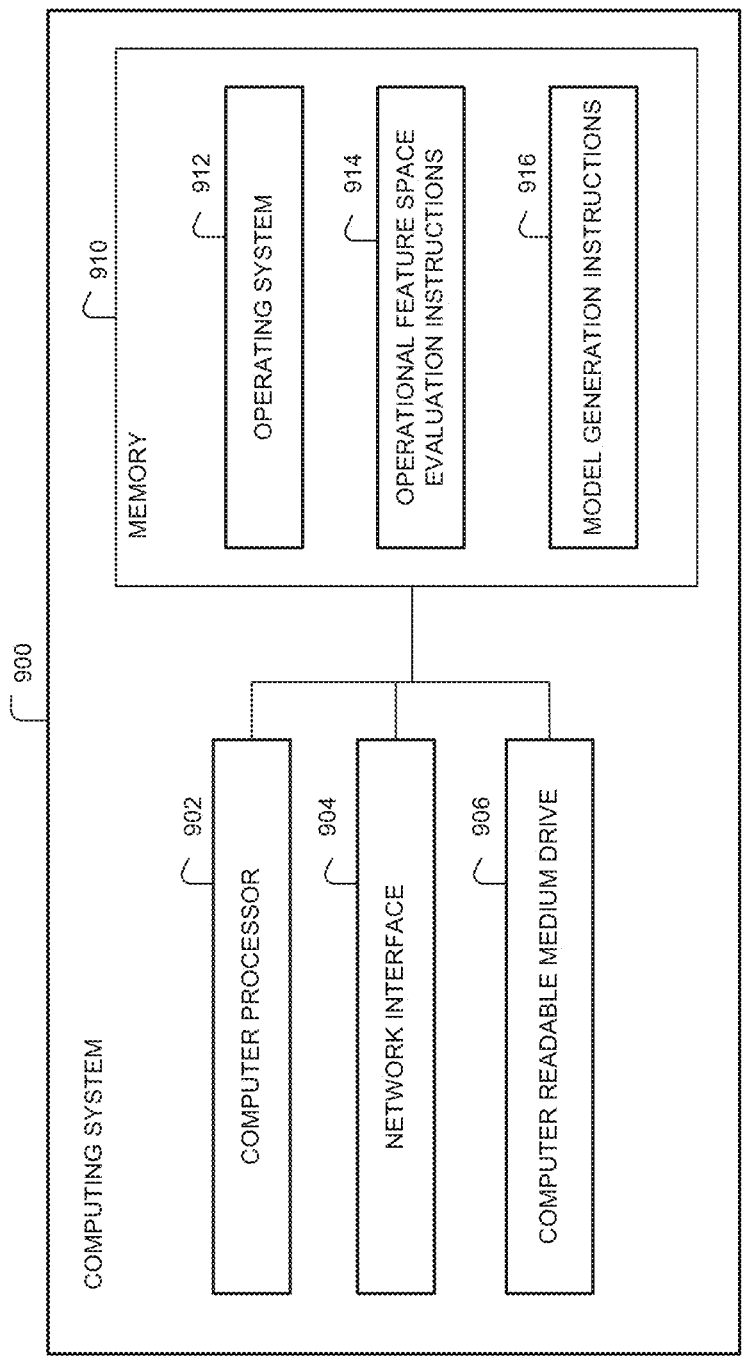
FIG. 9 is a block diagram of an illustrative computing system configured to implement aspects of the present disclosure according to some embodiments.

FIG. 9 illustrates various components of an example computing system 900 configured to implement various functionality described herein. The computing system 900 may be a physical host computing device on which an inference service 104 or some portion thereof is implemented.

In some embodiments, as shown, a computing system 900 may include: one or more computer processors 902, such as physical central processing units ("CPUs"); one or more network interfaces 904, such as a network interface cards ("NICs"); one or more computer readable medium drives 906, such as a high density disk ("HDDs"), solid state drives ("SSDs"), flash drives, and/or other persistent non-transitory computer readable media; and one or more computer-readable memories 910, such as random access memory ("RAM") and/or other volatile non-transitory computer readable media.

The computer-readable memory 910 may include computer program instructions that one or more computer processors 902 execute and/or data that the one or more computer processors 902 use in order to implement one or more embodiments. For example, the computer-readable memory 910 can store an operating system 912 to provide general administration of the computing system 900. As another example, the computer-readable memory 910 can store operational feature space evaluation 914 for evaluating feature space data and identifying novelties. As another example, the computer-readable memory 910 can store model generation instructions 916 for generating a supplemental or updated prediction model to address identified novelties in feature space data.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could." "might." "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   one or more processors programmed by the executable instructions to at least:
      obtain a corpus of training data comprising a plurality of training data input vectors and a plurality of reference data output vectors, wherein a reference data output vector of the plurality of reference data output vectors represents a desired output generated by an artificial neural network from a corresponding training data input vector of the plurality of training data input vectors;
      train the artificial neural network using the corpus of training data to generate classification determinations;
      evaluate a plurality of operational input vectors using the artificial neural network, wherein to evaluate each operational input vector of the plurality of operational input vectors, the one or more processors are programed by the executable instructions to:
         determine a first feature space point in a feature space using the artificial neural network; and
         generate first prediction output data based on the first feature space point, wherein the first prediction output data represents a first class of a plurality of classes into which the artificial neural network is configured to classify input data items;
      evaluate feature space data regarding a plurality of feature space points generated from evaluating the plurality of operational input vectors; and
      retrain the artificial neural network based on results of evaluating the feature space data.

2. The system of claim 1, wherein to evaluate the feature space data, the one or more processors are programmed by the executable instructions to:
   identify a feature space point cluster comprising a subset of the plurality of feature space points, wherein the feature space point cluster is associated with a class of the plurality of classes; and
   determine that the feature space point cluster is at least a threshold distance from a training feature space point cluster associated with the class.

3. The system of claim 1, wherein to evaluate the feature space data, the one or more processors are programmed by the executable instructions to:
   identify a feature space point cluster comprising a subset of the plurality of feature space points;
   determine that the feature space point cluster is at least a threshold distance from each training feature space point cluster associated with the plurality of classes; and
   determine, based on the feature space point cluster being at least the threshold distance from each training feature space point cluster with the plurality of classes, that the feature space point cluster is associated with a new class not part of the plurality of classes.

4. The system of claim 1, wherein to evaluate the feature space data, the one or more processors are programmed by the executable instructions to:
   identify a subset of the plurality of feature space points failing to satisfy a clustering criterion; and
   determine, based on the subset of the plurality of feature space points failing to satisfy the clustering criterion, that the subset of the plurality of feature space points is associated with a new class not part of the plurality of classes.

5. A computer-implemented method comprising:
   under control of a computing system comprising one or more processors configured to execute specific instructions,
      performing inference on a plurality of input data items using a machine learning model, wherein performing inference on a first input data item of the plurality of input data items comprises:
         evaluating the first input data item using the machine learning model to determine a first feature space point in a feature space; and
         generating first prediction output data based on the first feature space point, wherein the first prediction output data represents a first class of a plurality of classes into which the machine learning model is configured to classify input data items;
      evaluating feature space data regarding a plurality of feature space points generated from performing the inference on the plurality of input data items; and
      generating a supplemental machine learning model based on results of evaluating the feature space data, wherein the supplemental machine learning model is configured to generate second prediction output based on a second feature space point determined using the machine learning model.

6. The computer-implemented method of claim 5, wherein evaluating the feature space data comprises:
   identifying a feature space point cluster comprising a subset of the plurality of feature space points, wherein the feature space point cluster is associated with a class of the plurality of classes; and
   determining that the feature space point cluster is at least a threshold distance from a training feature space point cluster associated with the class.

7. The computer-implemented method of claim 6, further comprising determining a distance of the feature space point cluster from the training feature space point cluster, wherein the distance comprises one of: a Bhattacharyya distance, a Mahalanobis distance, or a Wasserstein metric.

8. The computer-implemented method of claim 6, wherein generating the supplemental machine learning model comprises training the supplemental machine learning model to classify input data items into the class based on the feature space point cluster.

9. The computer-implemented method of claim 5, wherein evaluating the feature space data comprises:
identifying a feature space point cluster comprising a subset of the plurality of feature space points;
determining that the feature space point cluster is at least a threshold distance from each training feature space point cluster associated with the plurality of classes; and
determining, based on the feature space point cluster being at least the threshold distance from each training feature space point cluster with the plurality of classes, that the feature space point cluster is associated with a new class not part of the plurality of classes.

10. The computer-implemented method of claim 9, wherein generating the supplemental machine learning model comprises training the supplemental machine learning model to classify input data items into the new class based on the feature space point cluster.

11. The computer-implemented method of claim 9, further comprising determining a distance of the feature space point cluster from a training feature space point cluster, wherein the distance comprises one of: a Bhattacharyya distance, a Mahalanobis distance, or a Wasserstein metric.

12. The computer-implemented method of claim 5, wherein evaluating the feature space data comprises:
identifying a subset of the plurality of feature space points failing to satisfy a clustering criterion; and
determining, based on the subset of the plurality of feature space points failing to satisfy the clustering criterion, that the subset of the plurality of feature space points is associated with a new class not part of the plurality of classes.

13. The computer-implemented method of claim 12, wherein generating the supplemental machine learning model comprises training the supplemental machine learning model to classify input data items into the new class.

14. The computer-implemented method of claim 5, wherein performing inference on the first input data item further comprises generating, using a confidence model of training data support for points in the feature space, a confidence value for the first prediction output data generated from the first input data item.

15. A system comprising:
computer-readable memory storing executable instructions; and
one or more processors programmed by the executable instructions to at least:
performing inference on a plurality of input data items using a machine learning model, wherein performing inference on a first input data item of the plurality of input data items comprises:
evaluating the first input data item using the machine learning model to determine a first feature space point in a feature space; and
generating first prediction output data based on the first feature space point;
evaluating feature space data regarding a plurality of feature space points generated from performing the inference on the plurality of input data items; and
generating a supplemental machine learning model based on results of evaluating the feature space data, wherein the supplemental machine learning model is configured to generate second prediction output based on a second feature space point determined using the machine learning model.

16. The system of claim 15, wherein the first prediction output data represents a first regression output.

17. The system of claim 15, wherein the first prediction output data represents a first class of a plurality of classes into which the machine learning model is configured to classify input data items.

18. The system of claim 17,
wherein to evaluate the feature space data, the one or more processors are further programmed by the executable instructions to:
identify a feature space point cluster comprising a subset of the plurality of feature space points, wherein the feature space point cluster is associated with a class of the plurality of classes; and
determine that the feature space point cluster is at least a threshold distance from a training feature space point cluster associated with the class; and
wherein to generate the supplemental machine learning model, the one or more processors are further programmed by the executable instructions to train the supplemental machine learning model to classify input data items into the class based on the feature space point cluster.

19. The system of claim 17,
wherein to evaluate the feature space data, the one or more processors are further programmed by the executable instructions to:
identify a feature space point cluster comprising a subset of the plurality of feature space points;
determine that the feature space point cluster is at least a threshold distance from each training feature space point cluster associated with the plurality of classes; and
determine, based on the feature space point cluster being at least the threshold distance from each training feature space point cluster with the plurality of classes, that the feature space point cluster is associated with a new class not part of the plurality of classes; and
wherein to generate the supplemental machine learning model, the one or more processors are further programmed by the executable instructions to train the supplemental machine learning model to classify input data items into the class based on the feature space point cluster.

20. The system of claim 17,
wherein to evaluate the feature space data, the one or more processors are further programmed by the executable instructions to:
identify a subset of the plurality of feature space points failing to satisfy a clustering criterion; and
determine, based on the subset of the plurality of feature space points failing to satisfy the clustering criterion, that the subset of the plurality of feature space points is associated with a new class not part of the plurality of classes; and
wherein to generate the supplemental machine learning model, the one or more processors are further programmed by the executable instructions to train the supplemental machine learning model to classify input data items into the new class.

* * * * *